United States Patent [19]
Karkowski et al.

[11] 3,801,262  
[45] Apr. 2, 1974

[54] PROCESS FOR THE PRODUCTION OF LIGHTWEIGHT EXPANDED AGGREGATE

[75] Inventors: Abdon Karkowski, Edmund Nowak, Roman Szromba, all of Krakow, Poland

[73] Assignee: Instytut Przemyslu Wiazacych Materialow, Budowlanych Opole, Poland

[22] Filed: July 8, 1971

[21] Appl. No.: 160,953

[30] Foreign Application Priority Data
July 23, 1970    Poland .................................. 142205

[52] U.S. Cl. ................................................. 432/13
[51] Int. Cl. ............................................. C04b 31/10
[58] Field of Search ................ 263/52, 53 R; 432/13

[56] References Cited
UNITED STATES PATENTS
| | | | |
|---|---|---|---|
| 3,600,476 | 8/1971 | Suzuki et al. ........................ | 263/52 |
| 3,066,031 | 11/1962 | Schifferle ......................... | 263/53 R |

*Primary Examiner*—John J. Camby  
*Attorney, Agent, or Firm*—Stevens, Davis, Miller & Mosher

[57] ABSTRACT

A method of the manufacture of an aerated lightweight expanded aggregate from a fly-ash, consisting in that the fly-ash is granulated with a slurry made of silt, or clay or any other mineral substances containing at least 30 per cent of grains of the dimensions below 5 microns, and at least 33 per cent of water, the so obtained granules being subsequently calcinated in a rotary kiln provided with a system for continuous control of temperature within the range of 900° to 1,400° C.

A method may also consist in that the fly-ash is mixed with water to such a proportion that the water content of the so obtained mixture is 30 to 60 per cent, the said mixture being fed in the form of a slurry to a rotary kiln.

2 Claims, No Drawings

PROCESS FOR THE PRODUCTION OF LIGHTWEIGHT EXPANDED AGGREGATE

This invention relates to a process for the production of lightweight expanded aggregate from a fly-ash produced in the combustion of pulverized coal in boiler houses of power plants and heat-and-power generating plants, the said aggregate being necessary for the obtainment of lightweight aggregate concrete.

There is known a process for the manufacture of lightweight expanded aggregate from the fly-ash produced in the combustion of pulverized coal in boiler houses of power plants and heat-and-power generating plants, which is necessary for the obtainment of lightweight aggregate concrete, consisting in that the fly-ash is mixed with 25 to 35 per cent of water, granulated, and particularly in disc-type granulators, and subsequently calcinated in the form of granules in shaft furnaces or on agglomeration belt conveyors. Large quantities of the fly-ash are retained by electrical precipitators,- however, due to a restricted efficiency of these precipitators finest grains of the fly-ash escape to the atmosphere. This is just a reason due to which the size of particles of a major part of the total mass of fly-ash retained by electrical precipitators lies between 0 and 200 or even 300 microns, while the proportion of fraction below 20 microns is in a majority of cases not enough to granulate this fly-ash by a known method, or to obtain from such a fly-ash the granules of the required strength. The so produced granules are subject to an easy disintegration which, at present, precludes the calcination thereof in the rotary kilns, since in such a case an enormous amount of the fly-ash would be blown out through the stack and the calcinated material taking the form of a dust or lumps would not comply with the requirements for lightweight aggregates. In addition to this, a low strength of granules results in the decrease of airiness of the feedstock column or layer in shaft furnaces or on agglomeration conveying belts,- which consequently causes an uneven flow of the air and gases through the feed material, differentiation of temperatures in the cross-sectional area of the feedstock and formation of sinters at some places and clusters of inadequately calcinated aggregate at the others.

A lightweight aggregate produced from the fly-ash by this known method is not uniformly expanded and requires additional mechanical processing, which lowers its properties - open pores and sharp edges being objectionable in the lightweight aggregate - and in addition to this, requires the installation of further crushing and classifying machinery and equipment.

Difficulties arising in the manufacture of lightweight expanded aggregate from the fly-ash produced in the combustion of pulverized coal in boiler houses of power plants and heat-and-power generating plants are also caused by a non-uniform amount of unburnt coal left in the fly-ash. The heat of combustion of summing up quantities of fuels, both in shaft furnaces and on agglomeration conveying belts, causes so high variations in temperature that the production of aggregates becomes impossible under such conditions, and even some agglomeration plants have been shut-down just for that reason.

There is also a method of manufacture of lightweight expanded aggregate known from the article entitled "Keramzite of silt-ash type" (Keramzyt ilowo-popiolowy) published in "Current Information" (Informacja Biezaca) No. 2/70, edited by the Industrial Association of Aggregates and Mineral Raw Materials, consisting in that a fine-grained silt in the amount of at least 30 per cent, having a 20 to 22 per cent water content is mixed initially with a fly-ash having a 21 to 34 per cent water content, and the so obtained mixture is fed successively to a box feeder, to smooth rolls, to a double-roll mixer and to perforated rolls wherefrom a plastically granulated feedstock is obtained, the so prepared feedstock being successively delivered to an intermediate tank, to a rotary table feeder, to a rotary kiln, to a drum-type cooler and finally to a ready product storage tank.

The drawbacks of this commonly known method are as follows: the necessity of transportation of large quantities of silt and storage thereof at the premises of lightweight aggregate plant, high consumption of water resulting in high heat consumption, employment of a large number of heavy processing machines involving frequent replacement of their component parts and in the first place, a persistent poor homogeneity of the feedstock and in consequence thereof also poor uniformity of the finished product.

The object of this invention is such a method of manufacture of lightweight expanded aggregate needed in the production of lightweight aggregate concrete, from the fly-ash produced in the combustion of pulverized coal in the boiler houses of power plants and heat-and-power generating plants, which will permit to manufacture a uniformly expanded aggregate requiring no additional mechanical processing and having controlled bulk density, controlled compressive strength and controlled insulating properties.

The technical task resulting from the established aim of the invention consists in the producing of granules of adequately high mechanical strength from the fly-ash, which would permit to calcinate lightweight expanded aggregates in a rotary kiln at a controlled temperature, or in the delivery of the feedstock in the form of a slurry into a rotary kiln.

According to this invention the method of manufacture of lightweight expanded aggregate wanted for the production of lightweight aggregate concrete, from the fly-ash of any size and/or chemical composition, produced in the combustion of pulverized coal in boiler houses of power plants and heat-and-power generating plants, consists in that the fly-ash is mixed with water to such a proportion that the water content of the mixture is 30 to 60 percent, the said mixture being fed in the form of a slurry into a rotary kiln and calcinated at a temperature of from 900° to 1,400° C, or in that the fly-ash of any size and/or chemical composition is mixed with a slurry made of silt or clay or of any mineral substance containing at least 30 per cent of grains of the dimensions smaller than 5 microns and at least 35 per cent of water, the said fly-ash-and-slurry mixture being subsequently granulated in the commonly known granulation equipment and fed in the form of granules to an industrial furnace provided with a continuous temperature control, where the granules are calcinated at 900° to 1,400° C.

In some justified cases the clay mud or the water used for spraying the fly-ash in the commonly known process equipment, may contain commonly known additives improving the economics of calcination or the quality of calcinated aggregate.

By the method according to this invention a lightweight expanded aggregate used in the production of lightweight aggregate concrete is manufactured from the fly-ash produced in the combustion of pulverized coal in the boiler houses of power plants and heat-and-power generating plants, characterized by a bulk density of from 350 to 900 Kg/cu.m, compressive strength of from 8 to 200 Kg/sq.cm, depending upon the requirements laid down, by closed internal pores and almost spherical shape of granules, by a rough surface thereof and by the size of granules which lies between 0 and 40 mm.

The application of the method according to this invention of the manufacture of lightweight expanded aggregate from the fly-ash produced in the combustion of pulverized coal in the boiler houses of power plants and heat-and-power generating plants permits to manufacture a uniformly expanded lightweight aggregate requiring no additional mechanical processing and having a controlled bulk density, controlled compressive strength and controlled insulating properties, which prove that the imposed aim of this invention has been attained and the technical task resulting from the imposed aim of this invention has been fulfilled.

What we claim is:

1. A method for the manufacture of lightweight expanded aggregate comprising mixing fly-ash with water in such a proportion that the water content of the mixture is from 30–60 percent and calcining the mixture at a temperature of from 900°–1,400° C.

2. The method of claim 1 wherein the water is in the form of a slurry of silt, clay or other mineral substances containing at least 30 percent of grains of less than $5\mu$ and at least 35 percent of water and the fly-ash slurry mixture is granulated prior to calcining.

* * * * *